(12) United States Patent
Cortright et al.

(10) Patent No.: US 7,303,833 B2
(45) Date of Patent: Dec. 4, 2007

(54) ELECTROLYTE SHEET WITH A CORRUGATION PATTERN

(75) Inventors: Jeffrey E. Cortright, Corning, NY (US); Thomas D. Ketcham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 73 days.

(21) Appl. No.: 11/015,119

(22) Filed: Dec. 17, 2004

(65) Prior Publication Data

US 2006/0134488 A1   Jun. 22, 2006

(51) Int. Cl.
*H01M 8/12* (2006.01)
(52) U.S. Cl. .......................................... 429/30; 429/33
(58) Field of Classification Search ................ None
See application file for complete search history.

(56) References Cited

U.S. PATENT DOCUMENTS

| 4,135,040 | A | 1/1979 | Thornton |
| 4,710,227 | A | 12/1987 | Harley et al. |
| 5,085,455 | A | 2/1992 | Bogner et al. |
| 5,273,837 | A | 12/1993 | Aitken et al. |
| 6,428,920 | B1 | 8/2002 | Badding et al. |
| 6,582,845 | B2* | 6/2003 | Helfinstine et al. ........... 429/33 |
| 2001/0044043 | A1 | 11/2001 | Badding et al. |
| 2002/0102450 | A1* | 8/2002 | Badding et al. ............. 429/32 |

FOREIGN PATENT DOCUMENTS

| EP | 0302972 | 2/1989 |
| EP | 0317676 | 5/1989 |

* cited by examiner

*Primary Examiner*—Jonathan Crepeau
(74) *Attorney, Agent, or Firm*—Svetlana Z. Short (57) ABSTRACT

An electrolyte sheet comprises a substantially non-porous body and has at least one stress-relief area on at least a portion of the electrolyte sheet. The stress-relief area has a surface with a plurality of smoothly domed cells.

20 Claims, 9 Drawing Sheets

ELECTROLYTE SHEET WITH A CORRUGATION PATTERN

BACKGROUND OF THE INVENTION

1. Field of the Invention

The present invention relates generally to inorganic electrolyte sheets suitable for use in fuel cells and, more particularly to electrolyte sheets with corrugation pattern that compensates for environmentally induced strain.

2. Technical Background

U.S. Pat. No. 4,135,040 describes the use of a corrugated and textured electrolyte to increase ion-conductive surface area. The patent specifies that this electrolyte is suitable for use in sodium-sulfur, sodium-halogen, lithium anode type cells and solid state cells. These types of galvanic "battery" cells utilize solid state electrolytes which conduct positive ions, such as sodium or lithium, which are very mobile at low temperatures. Such solid state electrolytes are typically fairly thick (over 200 micrometers), to maintain good mechanical integrity. This patent does not disclose solid oxide fuel cells, does not describe the thickness of the electrolyte, nor the dimensions of the features on the textured surfaces.

The use of electrolyte materials for solid oxide fuel cells has been the subject of considerable amount of research in recent years. The typical components of a solid oxide fuel cell comprise a negatively-charged oxygen-ion conducting electrolyte sandwiched between two electrodes. Electrical current is generated in such cells by oxidation, at the anode, of a fuel material, for example hydrogen, which reacts with oxygen ions conducted through the electrolyte. Oxygen ions are formed by reduction of molecular oxygen at the cathode.

U.S. Pat. No. 5,085,455 discloses thin, smooth inorganic sintered sheets. The disclosed sintered sheets have strength and flexibility to permit bending without breaking as well as excellent stability over a wide range of temperatures. Some of the disclosed compositions, such as yttria stabilized zirconia YSZ ($Y_2O_3$—$ZrO_2$) would be useful as electrolytes for fuel cells. It is known that at sufficient temperatures (e.g., about 725° C. and above), zirconia electrolytes exhibit good ionic conductance and very low electronic conductance. U.S. Pat. No. 5,273,837 describes the use of such compositions to form thermal shock resistant solid oxide fuel cells.

U.S. Patent Publication US2002/0102450 describes solid electrolyte fuel cells which include an improved electrode-electrolyte structure. This structure comprises a solid electrolyte sheet incorporating a plurality of positive and negative electrodes, bonded to opposite sides of a thin flexible inorganic electrolyte sheet. One example illustrates that the electrodes do not form continuous layers on electrolyte sheets, but instead define multiple discrete regions or bands. These regions are electronically connected, by means of electrical conductors in contact therewith that extend through vias in electrolyte sheet. The vias are filled with electronically conductive materials.

U.S. Patent Publication US2001/0044043 describes solid electrolyte fuel cells utilizing substantially planar, smooth electrolyte sheet with a roughened interface surface layer. This publication discloses electrolyte sheet thickness below 45 micrometers. The ceramic electrolyte sheet is flexible at such thicknesses.

U.S. Pat. No. 6,428,920 describes a porous nanocrystaline interface roughened layer placed on top of and sintered to the smooth electrolyte sheet (substrate). The porous nanocrystaline roughening layer has a randomly structured surface with submicron surface features (grain size below 1 micron and preferably below 0.5 micrometers) and characterized by the arithmetic average surface roughness of about 0.2 micrometers.

Electrical conductance of the electrolyte is proportional to its material conductance times its thickness. That is, the electrolyte's ohmic resistance depends on material properties of the electrolyte and is proportional to the thickness of the electrolyte. Thus, in order to reduce ohmic resistance and to improve electrical conductance, electrolyte thickness must be as thin as possible. However, reduction in electrolyte thickness results in physical weakening of the electrolyte. Thin electrolyte sheets may break during handling or processing. Furthermore, fuel cells undergo large thermal cycling and large thermal gradients, which induces thermal stresses in the electrolyte sheets. In addition, a mounted electrolyte sheet will expand at a rate that is different from the thermal expansion rate of its frame, which may cause cracking of the electrolyte sheet. A defect in an electrolyte sheet may necessitate a replacement of entire cell or electrolyte device.

SUMMARY OF THE INVENTION

One advantage of the electrolyte sheet of the present invention is that it provides increased multi-axial strain tolerance in an electrolyte sheet while improving or maintaining structural strength and maintaining electrode adhesion and uniform flexing capability.

According to one aspect of the present invention an electrolyte sheet comprises: a substantially non-porous body having at least one stress-relief area on at least a portion of the electrolyte sheet, said stress-relief area having surface with a plurality of smoothly domed cells separated from one another by arched areas.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts. Three exemplary embodiment of the inorganic electrolyte sheet of the present invention is shown schematically in FIGS. 1A-C. The electrolyte sheets are designated generally throughout by the reference numeral 10. The electrolyte sheets 10 are thin ceramic sheet, with two opposite major surfaces 20, 21 and an average thickness t. (FIG. 2.)

The electrolyte sheets 10 comprise a substantially non-porous body and has at least one stress-relief area 22 on at least a portion of the electrolyte sheet 10. The stress-relief area 22 has a plurality of cells 30. It is preferable that the cells 30 be smooth. That is, it is preferable that the cells 30 contain no sharp creases because sharp creases are stress enhancing features.

Figure 1A:
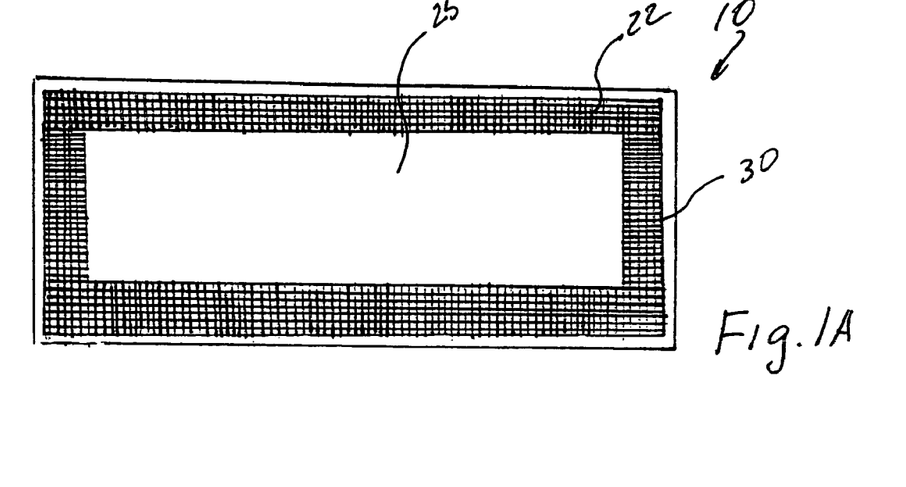
FIGS. 1A-1C illustrate schematically top views of differently patterned electrolyte sheets.
Figure 1B:
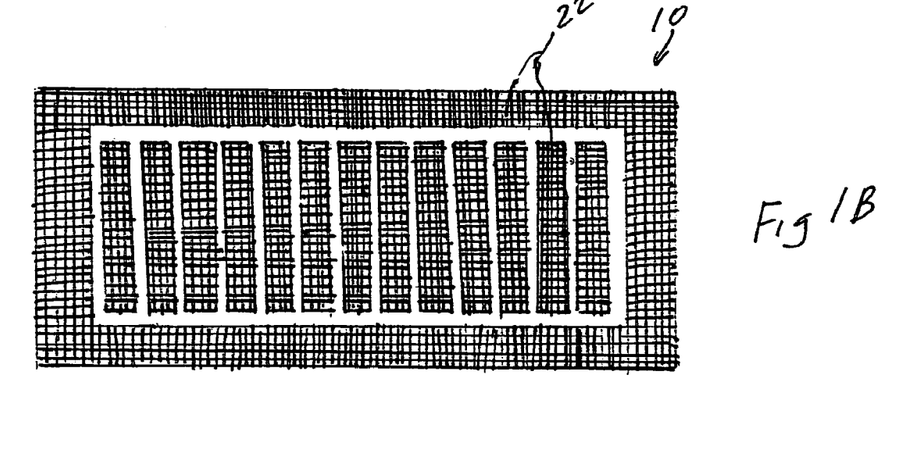
Figure 1C:
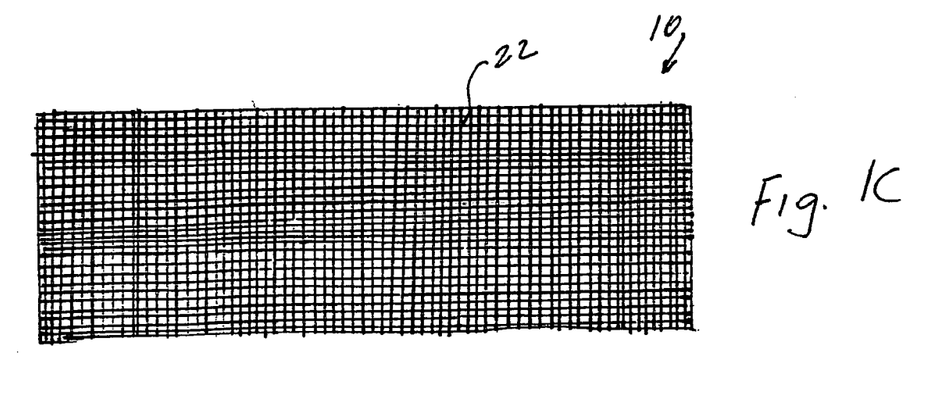
Figure 2:
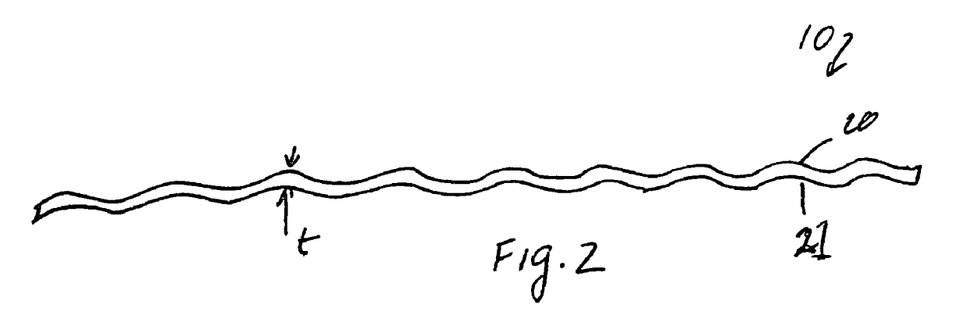
FIG. 2 is a schematic cross-sectional view of one embodiment of the patterned electrolyte sheet according to the present invention.

As illustrated in FIG. 1A the electrolyte sheet 10 may have a surface with a multi-axial corrugated pattern arranged in a plurality of small smoothed domed cells 30 surrounding the common central area 25. The stress relief area 22 may form a portion of the electrolyte sheet 10, as shown in FIGS. 1A and 1B, or may cover the entire surface of the electrolyte sheet as shown in FIG. 1C. In this example, almost the entire electrolyte sheet 10 is patterned with multiple unit cells 30, each unit cell 30 having the shape of a small dimple or a small bump. More specifically, in the electrolyte sheet embodiment shown in FIG. 1C the unit cells 30 are arranged in rectangular pattern, covering almost the entire area of the electrolyte sheet 10. Thus, almost the entire area of the electrolyte sheet 10 of this embodiment acts as a stress-relief area. The unit cells 30 may also be arranged in hexagonal, square, triangular or other patterns to cover the electrolyte sheet 10. The patterns can have different periodicities in different direction (for example, the unit cell bases may be elliptical, rectangular or irregular hexagons). Different patterns may also be included on different areas of the same electrolyte sheet.

Figure 3A:
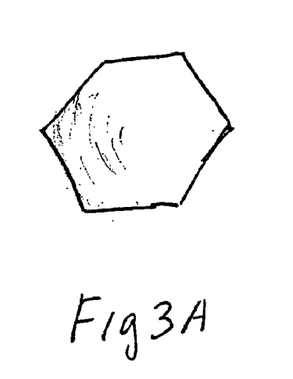
FIG. 3A is an enlarged top view of an exemplary cell that has a hexagonal base.
Figure 3B:
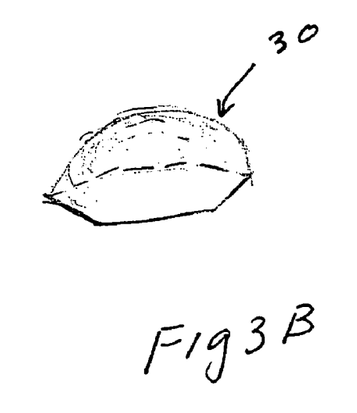
FIG. 3B is a perspective view of the cell illustrated in FIG. 3A.
Figure 4A:
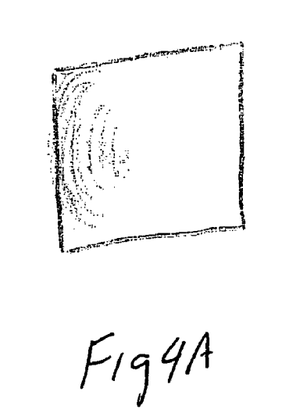
FIG. 4A illustrates schematically an enlarged top view of exemplary one cell that has a rectangular base.
Figure 4B:
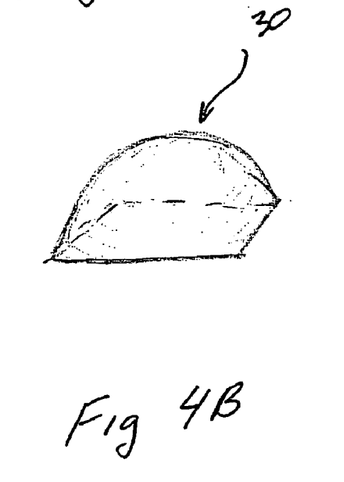
FIG. 4B is a perspective view of the cell illustrated in FIG. 4A.

The cells 30 may be arranged on the surface of electrolyte sheet 10 in any type of pattern, the pitch P of cells 30 being preferably in the 1 mm to 1 cm range. The base of each cell 30 may be, for example, rectangular, circular, triangular, hexagonal. As stated above, patterns can change across the area of the electrolyte sheet. FIG. 3A illustrates top view of an exemplary cell 30 that has a hexagonal base. FIG. 3B is a perspective view of the cell 30 illustrated in FIG. 3A. FIG. 4A illustrates top view of an exemplary cell 30 that has a rectangular base. FIG. 4B is a perspective view of the cell 30 illustrated in FIG. 4A.

Figure 5A:
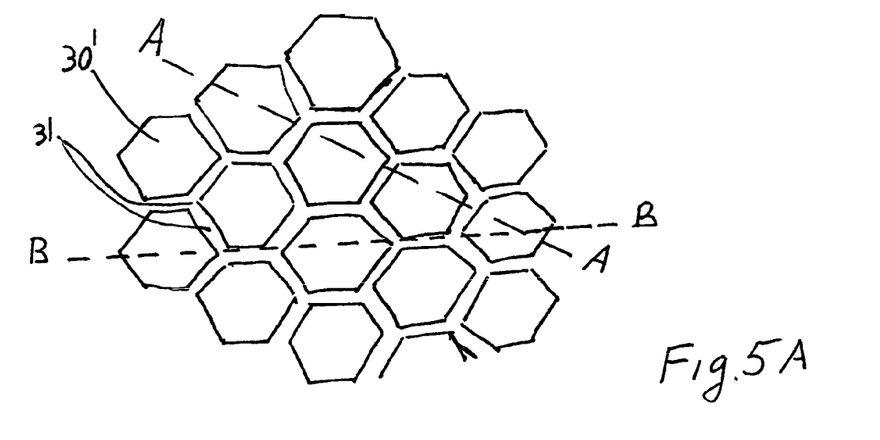
FIG. 5A illustrates schematically a top view of a section of a patterned electrolyte sheet that includes multiple domed cells separated by the flat areas.
Figure 5B:
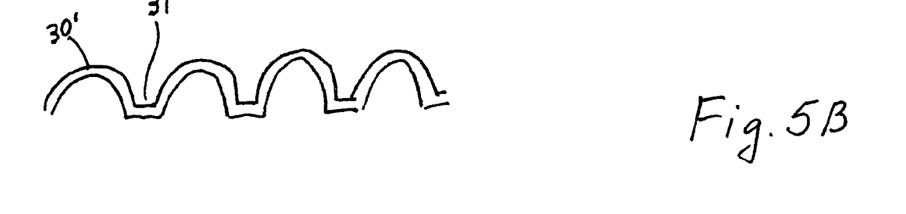
FIG. 5B illustrates the cross-section of the cells of FIG. 5A, taken along the line A-A of FIG. 5A.
Figure 5C:
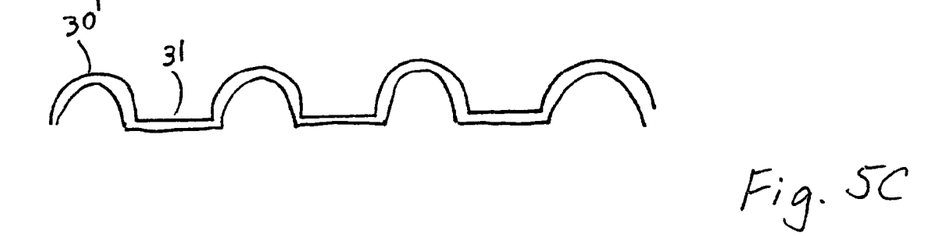
FIG. 5C illustrates the cross-section of the cells of FIG. 5A, taken along the line B-B of FIG. 5A.
Figure 6A:
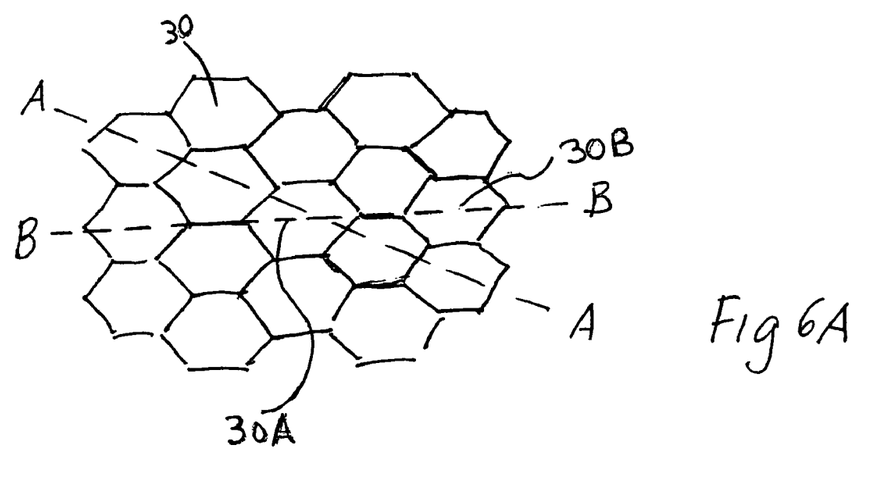
FIG. 6A illustrates schematically a top view of a section of a patterned electrolyte sheet that includes multiple domed cells that are not separated by the flat areas.
Figures 6B, 6C:
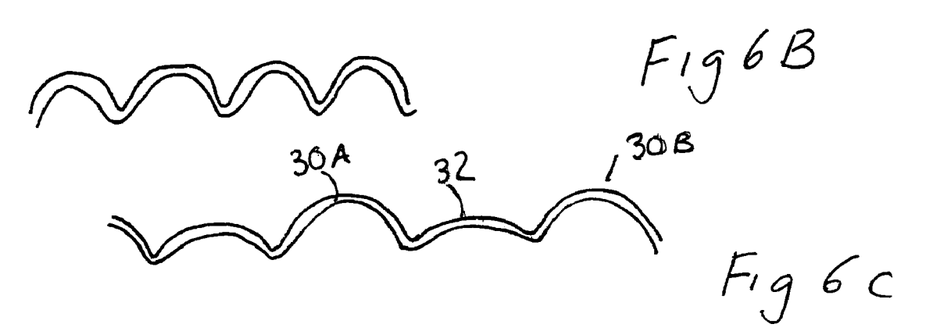
FIG. 6B illustrates the cross-section of the cells of FIG. 6A, taken along the line A-A of FIG. 6A.
FIG. 6C illustrates the cross-section of the cells of FIG. 6A, taken along the line B-B of FIG. 6A.
Figure 7A:
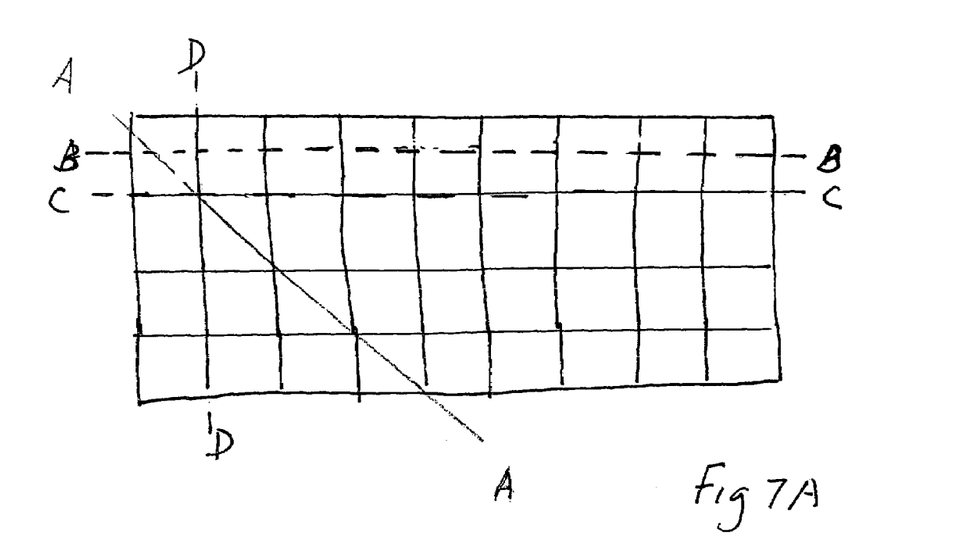
FIG. 7A illustrates schematically an enlarged top view of several cells comprising the pattern area of the electrolyte sheets of FIGS. 1A-1C and which include multiple domed cells that are not separated by the flat areas.
Figure 7B:
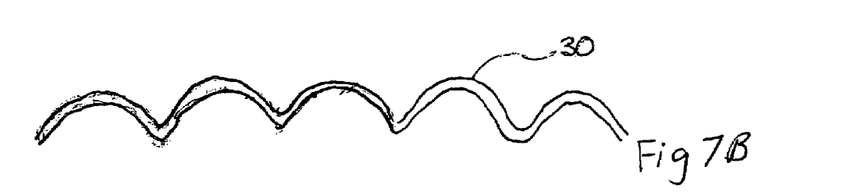
FIG. 7B illustrates the cross-section of the cells of FIG. 7A, taken along the line A-A of FIG. 7A.
Figure 7C:
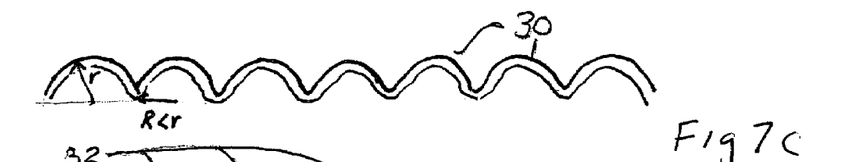
FIG. 7C illustrates the cross-section of the cells of FIG. 7A, taken along the line B-B of FIG. 7A.
Figure 7D:
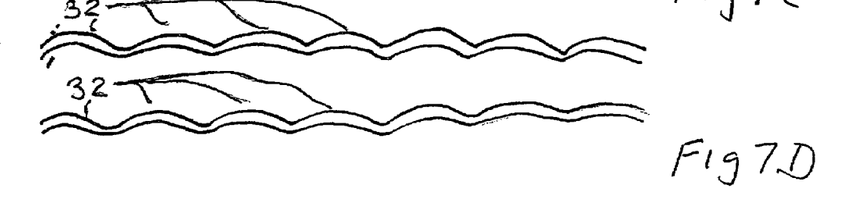
FIG. 7D illustrates the cross-section of the cells of FIG. 7A, taken along the line C-C of FIG. 7A.

FIG. 5A is a top view of a set of domed cells 30', each inscribed within a hexagonal base. The cells 30' are separated by the flat areas 31. FIG. 5B is a schematic cross-sectional view of the cells of FIG. 5A, taken along the line A-A. FIG. 5C is a schematic cross-sectional view of the cells of FIG. 5A, taken along the line B-B. Both cross-sectional views show flat areas 31 between the cells 30. During temperature changes, the flat areas 31 do not fully participate in the strain relief. Therefore, it is preferable that there are no flat areas between the cells 30, because the flat areas do not contribute to the stress-relief property of the stress-relief area 22. Thus, as shown in FIGS. 6A-6C, the cells 30 are preferably separated from one another, at least in one cross-section, by arched areas 32, created by the intersecting domes of the adjacent cells 30A and 30B. The arched areas 32 between the cells 30 preferably do not include sharp creases between the individual cells.

FIG. 6 is a top view of a set of domed cells 30, each inscribed within a hexagonal base. The cells 30 are not separated by the flat areas 31. FIG. 6B is a schematic cross-sectional view of the cells of FIG. 6A, taken along the line A-A. FIG. 6C is a schematic cross-sectional view of the cells of FIG. 6A, taken along the line B-B. Both cross-sectional views show that there are no flat areas 31 between the cells 30. FIG. 6B shows that the cells 30 are separated by arched areas 32. During temperature changes these arched areas fully participate in the strain relief.

FIG. 7 is a top view of a set of domed cells 30, each inscribed within a rectangular base. The cells 30 are not separated by the flat areas 31. FIG. 7B is a schematic cross-sectional view of the cells of FIG. 7A, taken along the line A-A. FIG. 7C is a schematic cross-sectional view of the cells of FIG. 7A, taken along the line B-B. Both cross-sectional views show that there are no flat areas 31 between the cells 30. FIG. 7B shows that the cells 30 are separated by arched areas 32. During temperature changes these arched areas fully participate in the strain relief.

Figure 8A:
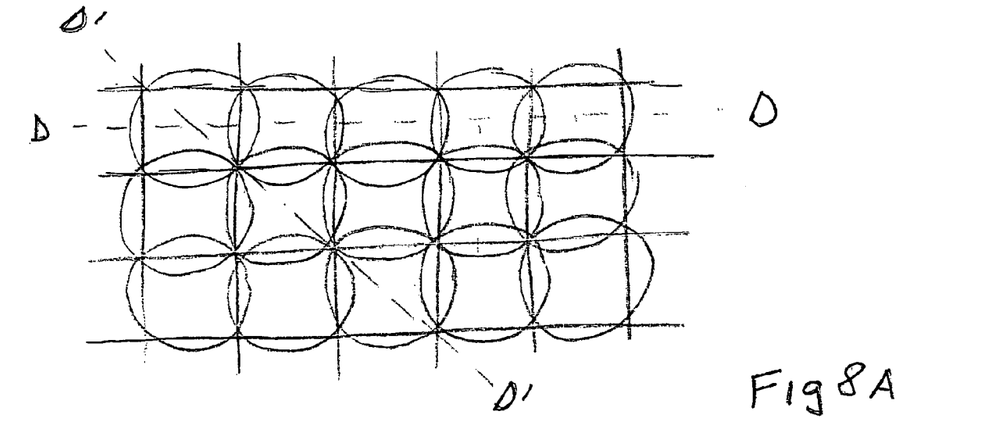
FIG. 8A illustrates schematically an enlarged cross-sectional view of several cells comprising the pattern area of the electrolyte sheets of FIGS. 1A-1C.
Figure 8B:
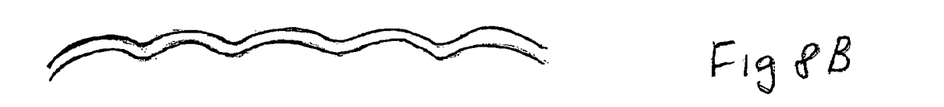
FIG. 8B illustrates schematically an enlarged cross-sectional view of several cells comprising the pattern area of the electrolyte sheets of FIGS. 1A-1C.
Figure 8C:
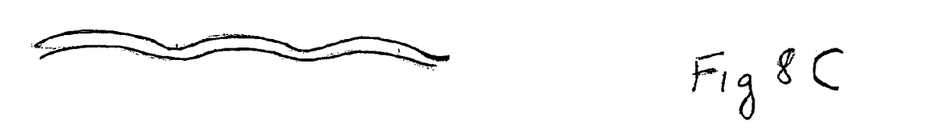
FIG. 8C illustrates schematically an enlarged cross-sectional view of several cells comprising the pattern area of the electrolyte sheets of FIGS. 1A-1C.

FIG. 8A illustrates schematically how the rounded, domed cells are inscribed onto rectangular base areas. FIG. 8B illustrates a schematic cross-section along the line D-D, the cross-section cutting across the highest portion of the domes. FIG. 8C illustrates a schematic cross-section along the line D'-D', the cross-section cutting across the cells diagonally. Both FIGS. 8B and 8C show that the cross-sections include multiple domed shapes, with no flat areas therebetween, the difference being that the domes of FIG. 8B are higher than the domes of FIG. 8C. The undulation patterns of FIGS. 8B and 8C are formed by the overlap between rows of domes (intersection line along two or more spheroids.

Figure 9:
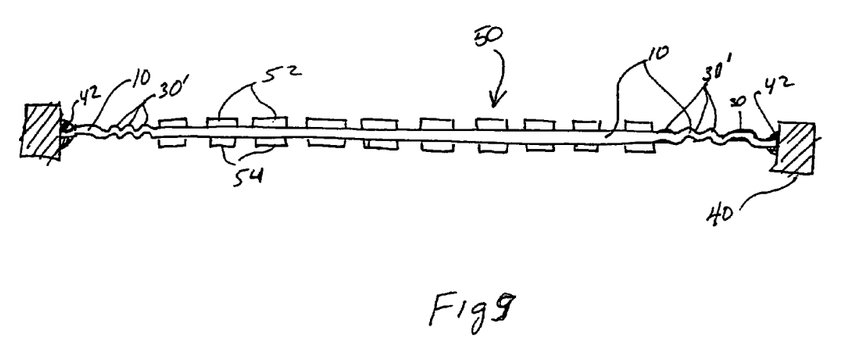
FIG. 9 is a schematic side view of the electrolyte device including the electrolyte sheet of FIG. 1A mounted in a frame.

In a solid oxide fuel sell stack, the electrolyte device (i.e., the electrolyte sheet, anode(s), cathode(s) and other fuel cell component(s)) is mounted in a frame 40 and is sealed with a sealant 42, for example, glass frit (FIG. 9). FIG. 9 illustrates schematically that in this exemplary embodiment the electrolyte sheet 10 is much thinner than the frame 40. When the frame 40 and the seal material have expansion coefficients that closely match that of the electrolyte sheet 10 (i.e., the difference in CTE is about $0.2 \times 10^{-6}$ or less), cells 30 and the arched areas 32 of the stress relief area 22 may fully accommodate the expansion differences between the electrodes, current collectors, the electrolyte sheet as well as the frame and the seal.

If the frame 40 and the seal material have expansion coefficients that do not closely match that of the electrolyte sheet 10, and/or if the temperature is changes rapidly, such that there is more than 50° C. difference in temperatures between the electrolyte sheet 10 and the frame 40, cells 30 and the arched areas 32 of the stress relief area 22 accommodate large expansion and/or temperature differences between the frame 40 and the electrolyte sheet 10. Thus the stress relief area 22 reduces the stresses and the spatial extend of the stresses throughout the electrolyte sheet. More specifically, as the temperature of the fuel cell device goes up, the thin electrolyte sheet 10 heats faster than the relatively thick frame 40. When the electrolyte sheet 10 is hot, while the frame 40 is relatively cool, the electrolyte sheet without the stress relief area(s) (i.e., without cells 30) would experience a large amount of bending, compressive and tensile strain in the areas near the frame 40. However, upon cooling, the electrolyte sheet 10 that has strain relief area(s) 22 in accordance with the present invention releases this strain/stress, for example, via an increase in the height of the cells 30. The arched areas 32, between the cells 30 also contract, thereby releasing tensile stresses. Similarly, when the fuel cell device is cooling rapidly, the electrolyte sheet 10 cools faster than the frame 40, so that while the frame 40 stays hot while the electrolyte sheet 10 is relatively cool. However, the electrolyte sheet 10 with the strain relief area(s) 22 releases this strain/stress via flattening (i.e., decrease in the height) of the cells 30 and expansion (smoothing out) of the arched areas 32 between the cells.

It is noted that matching the CTE of the frame 40, electrolyte sheet 10 and the seal material helps to relieve thermal stresses during steady state temperature conditions, but this is not enough to compensate for the unequal temperatures of the frame 40 and the electrolyte 10 during large and rapid thermal fluctuations.

The common central area 25 of the electrolyte sheet 10 may include: (i) at least one cathode disposed on a first surface of the electrolyte sheet; and (ii) at least one anode disposed opposite the cathode on a second surface of the electrolyte sheet. One of embodiments of the present invention includes a plurality of anodes and a plurality of cathodes disposed on opposing sides of the electrolyte sheet 10.

The specific size and pitch of the cells 30 should be determined by the stresses acting on the electrolyte sheet and the thermal expansion coefficients of the various materials (frame, sealant, electrodes, current collectors, etc.). The number of cells cell height, pitch and the arc curvature of the areas 32 between the cells 30 of the stress relief area(s) 22 will determine the amount of available strain/stress relief. The maximum strain relief is in direction where the pattern has the maximum combination of corrugation height and maximum number of domes. Preferably, the cells 30 should be between 50 um and 1 cm high (peak-to-valley), more preferably between 0.1 cm and 0.8 cm and most preferably less than 0.5 cm in height. The fold pitch P (i.e. the distance between two heights or two lows) is between 50 um and 2 cm, preferably between 0.1 cm and 2 cm and more preferably less than 1 cm. If the patterned areas corresponding to the top of the domes of the unit cells 30 that are too high (larger than 0.5 cm), they may interfere with some subsequent processing operations, for example, electrode printing. However, if the corrugations are too small, the electrolyte sheet 10 may reach its fracture point (most likely on a tensile region) without getting adequate relief from the compensatory stretching/construction of the electrolyte sheet 10 in the stress-relief area. Thus, for thin electrolyte sheets (for example, less than 45 μm thick) it is preferable that the ratio of cell height H the thickness t of the electrolyte sheet 10 be at least 2 and more preferably at least 2.5 and most preferably 3 or higher. It is noted that the amount of stress/strain relief provided by the stress-relief area(s) 22 depends on the strength of the electrolyte sheet material and the thickness of the electrolyte sheet 10 at the stress-relief area 22.

According to the above described embodiments, the electrolyte sheet 10 has an average thickness t greater than 5 micrometers and less than 100 micrometers. It is preferable that the average thickness be below 45 micrometers and most preferable that the average thickness t is below 25 micrometers.

Furthermore, the electrolyte sheet 10, including the stress-relief areas may also be micro textured. For example, it may include multiple indentations, 5 micrometer or smaller in depth. It is preferable that for thin electrolyte sheets the indentations of the microtecture be less than ½ of the sheet thickness. For example, if the sheet thickness is 8 μm, it is preferred that the indentations are less than 4 μm deep. These indentations may be periodically arranged on the surface of the electrolyte sheet 10. However, the indentations may also be in a non-periodic arrangement.

Figures 10A, 10B:
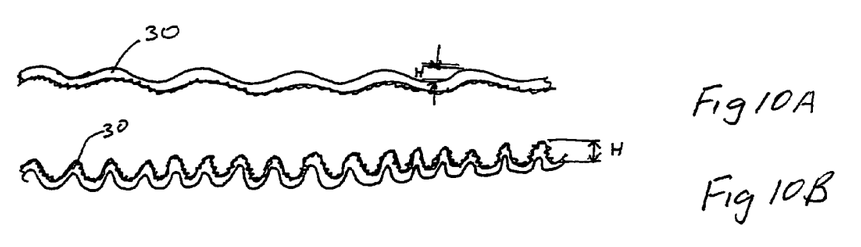
FIGS. 10A-10C illustrate schematically cross-sections of different electrolyte sheets.
Figure 10C:
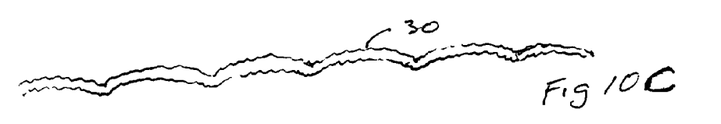

A cross-section of a portion of the exemplary electrolyte sheet 10 is illustrated schematically in FIGS. 10A-10C. The cells 30 may be wider than they are deep and may be spaced apart by distances greater than their height. (FIG. 10A.) Alternatively, the cells 30 may be spaced apart by distances equal to or smaller than their height H. This is shown schematically, for example, in FIG. 10B. As described above, the cells 30 may also be micro-textured on either one or both sides, as shown in FIGS. 10A-10C. For example, cells 30 may have an average height of 50 micrometers or greater and may include grooves or other structure (for example, 0.5 micrometers deep) on one or both surfaces.

Figure 11:
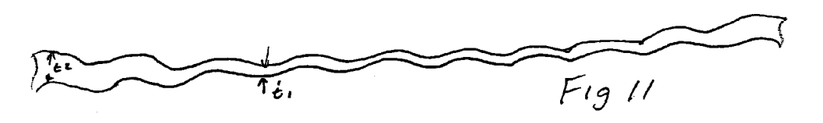
FIG. 11 illustrates schematically a cross-section of another embodiment of the electrolyte sheet of the present invention.

The thickness of the electrolyte sheet 10 may also vary, depending on location on the electrolyte sheet. For example, in order to minimize ionic resistance of the electrolyte between the electrodes (i.e., anode/cathode pair), while maintaining the strength on the border of the electrolyte sheet, the electrolyte sheet may have different thickness on different parts. Thus it may be advantageous that the border regions of the electrolyte sheet 10 have larger average thickness than the regions needing lower ionic resistance. Thus, the exemplary electrolyte sheet 10 of FIG. 11 includes thicker and thinner areas to properly accommodate the balance of electrical resistance and strength.

As stated above, the patterned area of the electrolyte sheet 10 may be either a small area of the electrolyte sheet 10, or may cover the entire electrolyte sheet 10. If the large area of the electrolyte sheet 10 is patterned in this manner, the depth of the dimples or the height of the domes should be relatively small, to enable printing of electrodes and other components on the electrolyte sheet 10. Thus, if most of the electrolyte sheet 10 is patterned in this manner, it is preferable that the depth of the dimples or the height H of the domes be less than 3 mm, and more preferably, less than 1 mm.

The cells 30 reduce the electrolyte sheet's susceptibility to breakage due to strain and stress which results from rapid temperature cycling and large (200° C. or more) temperature changes, as well as due to the thermal gradients across the electrolyte sheet 10. This improvement in mechanical properties of the electrolyte sheet 10 advantageously enables the electrolyte sheet 10 to operate at under higher temperature gradients, withstand higher and more rapid temperature fluctuations.

The electrolyte sheet 10 is has a substantially non-porous (i.e., substantially without closed pores, porosity being less than 5%) body. It is preferable that porosity is less than 3% and more preferable that porosity is less than 1%. The electrolyte sheet 10 preferably has an average thickness T that is greater than 4 micrometers and less than 100 micrometers, preferably less than 45 micrometers, more preferably between 4 micrometers and 30 micrometers, and most preferably between 5 micrometers and 25 micrometers. Lower average thickness is also possible. The lower limit of thickness is simply the minimum thickness required to render the structure amenable to handling without breakage. It is preferable that the total thickness of the electrolyte sheet and the electrodes is less than 150 µm, preferably less than 100 µm. It is preferable that the electrolyte sheet body is a monolithic body (i.e., a body produced as one piece instead of multiple layers of different porosity that have been sintered together). It is also noted that the corrugated electrolyte sheets may be utilized in solid oxide fuel cells that are either electrolyte or are anode or cathode supported.

Figure 12:
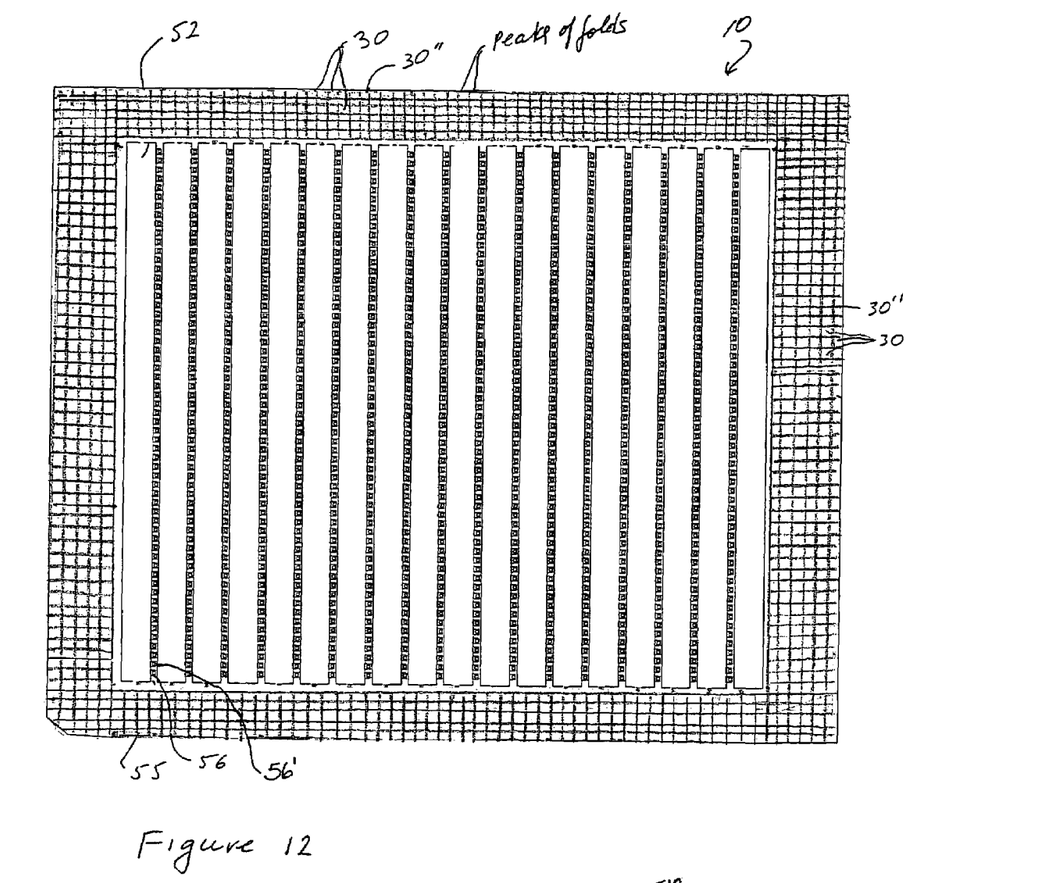
FIG. 12 illustrates schematically a top view of an exemplary electrode-electrolyte assembly.
Figure 13:
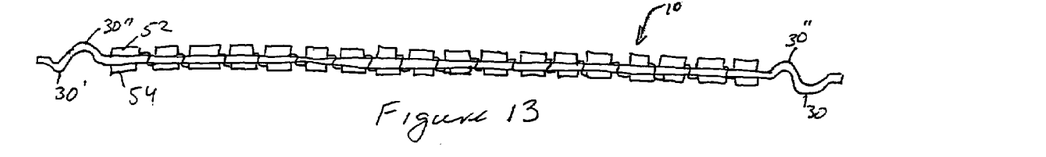
FIG. 13 is a cross-sectional view of the electrode-electrolyte assembly of FIG. 13.

The thin, patterned electrolyte sheets such as those described above can be advantageously utilized in the manufacture of solid oxide fuel cells. Thus, according to one embodiment of the present invention a solid oxide electrode/electrolyte assembly 50 of a fuel cell comprises: (i) an electrolyte sheet 10 with a substantially non-porous body, the electrolyte sheet 10 having at least one stress-relief area with a plurality of smoothly domed cells 30 separated from one another by arched areas, (ii) at least one cathode disposed on a first surface of the electrolyte sheet; and (iii) at least one anode disposed opposite the cathode on a second surface of the electrolyte sheet. It is preferably the electrolyte sheet 10 be self supporting zirconia-3 mole % yttria electrolyte sheet that supports multiple electrodes 52, 54 in the form of rectangular segments connected through small via holes 56 in the electrolyte sheet 10. The top plane of the electrode-electrolyte assembly is shown in FIG. 12. FIG. 13 is a schematic elevational cross sectional view of a of the electrode-electrolyte assembly shown in FIG. 12. According to this embodiment the electrode/electrolyte assembly 50 includes a plurality of anode-cathode pairs 52, 54. The anode-cathode pairs 52, 54 are separated from one another by via galleries 55. The via galleries 55 include a plurality of interconnects (called "via interconnects") 56' situated in the via holes 56. These interconnects 56' conduct electronic current from the anode of one cell to the cathode of an adjacent cell.

Thin electrolyte sheets can be formed in the green state in a molded configuration and subsequently sintered to form an electrolyte sheet with a large measure of flexibility. Preparation of green (unfired) material is known in the art and is described, for example in U.S. Pat. No. 4,710,227. More specifically, this patent discloses the preparation of thin flexible "green" (unfired) tapes from solutions, the tapes being coated and cut, stacked and fired to form thin-dielectric capacitors. This type of process is further described in published European applications EP 0302972 and EP 0317676. According to U.S. Pat. No. 5,089,455, in order to manufacture a thin electrolyte sheet with a patterned stress relieve area, a thin sheet or layer comprising the green (pre-ceramic) material, is first produced. The green material is then sintered to provide a patterned, sintered ceramic sheet with flexibility sufficient to permit a high degree of bending without breakage under an applied force. Flexibility in the sintered ceramic sheets is sufficient to permit bending to an effective radius of curvature of less than 20 centimeters or some equivalent measure, preferably less than 5 centimeters or some equivalent measure, more preferably less than 1 centimeter or some equivalent measure.

By an "effective" radius of curvature is meant that radius of curvature which may be locally generated by bending in a sintered body in addition to any natural or inherent curvature provided in the sintered configuration of the material. Thus, the resultant curved sintered ceramic electrolyte sheets can be further bent, straightened, or bent to reverse curvature without breakage.

The flexibility of the electrolyte sheet will depend, to a large measure, on layer thickness and geometry of its folds and, therefore, can be tailored as such for a specific use. Generally, the thicker the electrolyte sheet the less flexible it becomes. In some exemplary embodiments thin electrolyte sheets are flexible to the point where toughened and hardened sintered ceramic electrolyte sheet 10 may bend without breaking to the bent radius of less than 10 mm, or even 5 mm. Such flexibility is advantageous when the electrolyte sheet 10 is used in conjunctions with electrodes and/or frames that have dis-similar coefficients of thermal expansion and/or thermal masses.

The patterning of the electrolyte sheet 10 can be accomplished in various manners prior to sintering of the electrolyte sheet 10. For example, electrolyte sheets 10 with corrugated stress relieve area (s) can be produced by providing a green sheet of solid, negative ion-conducting (e.g., $O^{--}$) pre-ceramic material (for example, zirconia-3 mole % yttria, referred to herein as 3YSZ), forming a plurality of folds thereby creating at least one stress relief area, and then sintering the green sheet to provide a solid ion conductive electrolyte sheet 10 with a corrugated pattern. It is preferable that the sintering is done at temperatures above 1000° C., more preferably above 1300° C., for about 1-3 hours. For example, a method of making an electrolyte sheet 10 includes the steps of: (a) providing a green pre-ceramic sheet; (b) patterning the green pre-ceramic sheet such that it has a corrugation pattern containing multiple and/or dimpled domed cells, (c) sintering the corrugated, green pre-ceramic sheet to provide an electrolyte sheet with a substantially non-porous body, the non-porous body having a corrugated surface with multiple domes and/or dimples, separated by arched areas.

The patterning step may be achieved, for example, by molding or embossing when the green sheet is placed in a suitable mold or die to form desired surface folds or cell structures with folds. Alternatively, sufficiently thin ceramic sheets can be also reformed through a process of superplastic deformation at high temperatures below their melting points. However, more effective and economic electrolyte sheet patterning can be achieved through the process of reshaping unfired green sheet at or near room temperature (20° C.) prior to sintering. However, the electrolyte sheet may also be patterned at a higher temperature, for example, 50° C., 75° C., 100° C., 150° C. or 200° C.

Figure 14:
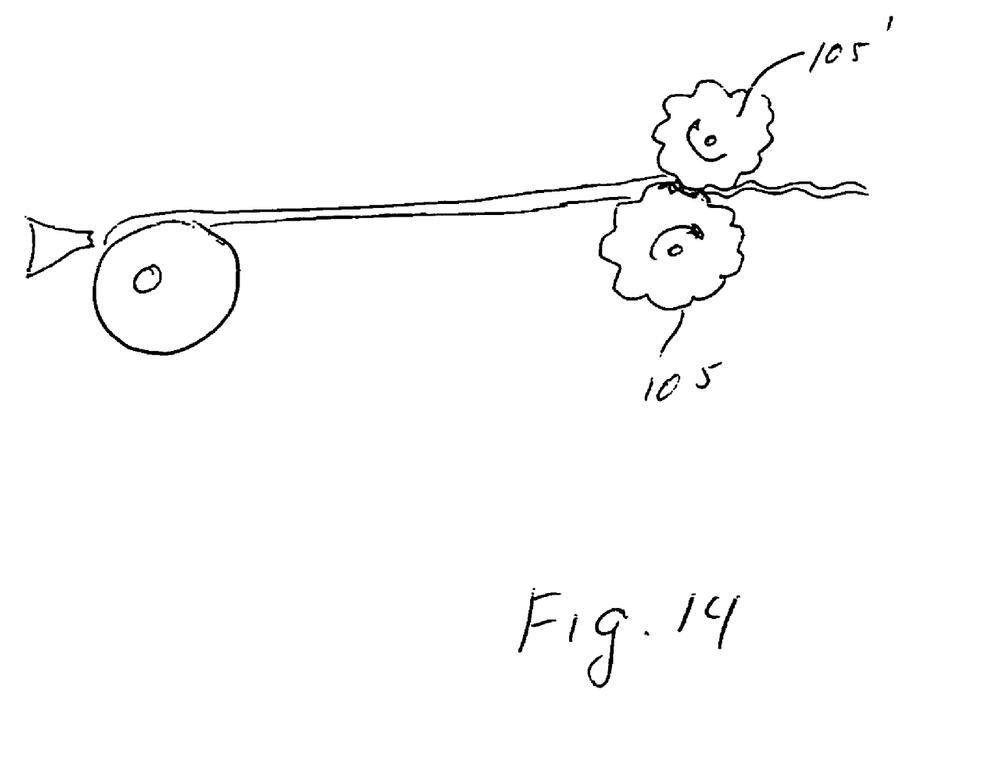
FIG. 14 illustrates schematically a method of making corrugated electrolyte sheets.

There are several methods of producing the desired patterns in a flexible ceramic. One method is to run a cast, but unfired, green sheet or tape through embossing rollers. At least one of these rollers 105, 105' is patterned. This is illustrated schematically in FIG. 14. The high areas of the rollers 105, 105' will stretch or squeeze the green pre-ceramic, thinning some areas. When working with green (i.e., unfired) pre-ceramic sheets of 15 to 30 micrometers thick, it is preferable to have the green pre-ceramic material run through the two rollers while on a substrate that is as thick or thicker than the green sheet. The green sheet may be also placed between two polymer carrier sheets during embossing. Another method of making a patterned electrolyte sheet is to vacuum form the green ceramic sheet on a mold.

The preferred electrolyte sheets 10 are formed of a polycrystalline ceramic selected from a group comprising of ion conductors, preferably oxygen ion conductors such as partially stabilized zirconia or stabilized zirconia, the partially stabilized, or stabilized zirconia, being doped with a dopant selected from the group comprising of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof. The crystalline geometries of zirconia such as tetragonal, monoclinic, and/or cubic and their combinations are all important physical parameters of this structural material. It is most preferable that partially stabilized zirconia is utilized because of its transformation toughening property. The tetragonal phase transforms into monolithic phase under stress and effectively prevents crack formation and propagation. Thus, the electrolyte sheet is more durable, mechanically strong and easier to handle. The more preferable stabilizing dopants are Y, Yb, Ca, Mg, or Sc. Of these dopants Sc, Yb and Y have excellent ionic conductivity. Ceramic sheets can be made tougher by selecting certain toughening agents known to those skilled in this art. Particularly useful and preferred toughening agents are the oxides of tantalum and niobium which can be advantageously added to the above stabilizers. It is noted that Nb, Ta, Ce and Ti additions can also lessen water vapor degradation effects seen at moderate temperatures.

The preparation of a green 3YSZ based sheet can involve some form of casting an appropriate ceramic slip. One such slip is described in the following example.

EXAMPLE 1

Preparation of a Ceramic Slip

A ceramic slip is made containing 100 grams of zirconia powder using the components shown in Table 1, below.

TABLE 1

Components of Slip Batch

| Component | Manufacturer | Form | Function | Batch mass |
|---|---|---|---|---|
| Zirconia TZ-3Y | Tosoh | powder | ceramic | 100.0 g |
| Ethanol | Mallinkrodt | liquid | solvent | 36.36 g |
| 1-Butanol | Fisher | liquid | solvent | 8.79 g |
| Propylene Glycol | Fisher | liquid | solvent | 2.00 g |
| Water (distilled) | | liquid | solvent | 2.50 g |
| Emphos PS-21A | Witco | liquid | dispersant | 1.00 g |

All ingredient bottles are kept tightly closed until used to reduce water pickup. A 250 ml Nalgene® polyethylene plastic container is cleaned by rinsing twice with about 10-20 ml of ethanol or methanol. The container is then placed in a 70° C. drying oven to evaporate the alcohol. After drying, the container and lid are weighed. The zirconia powder is weighed out in a weighing boat and set aside. The ethanol is pipetted into the dried Nalgene container. The 1-butanol is then pipetted into the plastic container. Subsequently, propylene glycol is pipetted into the container. Finally, the water and, then, the Emphos PS-21A are pipetted into the container. About 450 grams of 10 mm Tosoh TZP-3Y milling media is weighed out and the weight recorded. The media is then added to the container and the container is gently shaken. The zirconia powder is then added from the weighing boat. The lid is replaced onto the container and tightened. The closed container is re-weighed and the total weight of solvents, powder, and dispersant is calculated. The slip is then subjected to vibratory milling for 72 hours, after which the viscosity of the slip is measured.

Two settling steps are performed in order to remove the coarse grains and narrow the grain size distribution in the slip. A double settling technique provided a good grain size distribution with acceptable material losses.

A second 125 ml Nalgene® plastic container and lid are washed and dried as above. The second container and lid is weighed and the weight recorded. The slip from the milling container is poured into the second container, leaving the milling media in the original container. The slip and second container with lid is then weighed. The coarse grains are allowed to settle out of the slip for 72 hours. A third container and lid are washed, dried, weighed, and the weight recorded. Carefully, the unsettled slip is pipetted into the third container, being careful not to pick up any of the settled sediment. The pipetted slip with the third container with lid are weighed. This slip is then allowed to settle for an additional 24 hours. The residue/sediment in the second container is dried in a ventilated oven at about 90° C. for at least three hours and the dried residue and container plus lid are weighed.

A fourth 125 ml plastic container and lid are washed and dried as above. The weight of this fourth lid and container is then recorded. Again, the slip from the third (24 hour settling) container is pipetted into the fourth container, being careful not to pick up any of the settled residue with the pipette. The fourth container and slip are weighed and the weight recorded. The reside is dried in the third container, as above, and then weighed. From the recorded weights, it can be determined how much ceramic powder is left in the fourth container.

A weak flocculating agent, glacial acetic acid, a plasticizer, and a binder are added to the ceramic powder present in the remaining slip. The components used for flocculation and binding, reported in weight percent in excess of the weight of the remaining ceramic powder, are shown in Table 2, as follows:

TABLE 2

Components Used For Flocculation and For Binder System

| Component | Manufacturer | Form | Function | Batch mass |
|---|---|---|---|---|
| Glacial Acetic Acid | Malinckrodt | liquid | flocculent | 1 wt % of remaining ceramic powder |
| Isopropyl alcohol | Fisher | liquid | acid dilution | 1 wt % |
| Dibutyl-Pthalate | Aldrich | liquid | plasticizer | 3.5 wt % |
| Polyvinyl Butyral | Monsanto | powder | binder | 6 wt % |

A 50/50 wt % solution of glacial acetic acid in isopropyl alcohol is made. 2 wt % (in excess of the weight of the remaining ceramic powder) of this solution is pipetted into the slip in the fourth container. The lid is replaced and the container is gently shaken.

Next, 3.5 wt % (in excess of the weight of the remaining ceramic powder) of dibutyl-pthalate is pipetted into the slip in the fourth container. The lid is replaced and the container is gently shaken. Using a weighing boat, 6 wt % (of the remaining ceramic powder) of polyvinyl butyral is weighed out and poured into the slip. The lid is replaced and the container is gently shaken. This container is then placed on a paint shaker type of device for at least 15 minutes to fully dissolve the binder. Two clean zirconia milling media are put into the container and the container is placed on a roller mill at low speed for three days.

The slip is cast on a Teflon™ substrate or film and then is dry for about 5 to 30 minutes. If the green film is dried too rapidly (for example, less than 1 minute) the ceramic sheet will curl on sintering. The green film is then dried in a drying oven for about 30 minutes to about 2 hours at a temperature of about 50° to about 70° C. After the green sheet is oven dried, it it can be vacuum formed over a metal or plastic mold that has been heated to 75° C.-150° C., preferably about 120° C. with a thin layer of Teflon between the green sheet and the mold. The edge of the mold has vacuum channels or, alternatively, small perforations for vacuum. The Teflon™ coating also has small holes aligned with the vacuum channels of the mold. A vacuum pump applies the vacuum through the vacuum channels or perforations and pin holes in the teflon, which pulls the green sheet onto the mold, forming the desired corrugation pattern(s). The mold can be made easily by using a small ball end mill to mill dome shape depressions into a flat aluminum plate. The ball end mill is repeatedly stepped across the surface in the pattern desired and the surface is milled to the desired depth.

A second thin 25 micron thick Teflon sheet is carefully placed on the green ceramic sheet and covers all the pin holes in the bottom Teflon and any other vacuum holes or channels. After forming the corrugations in the green ceramic sheet, the vacuum pump is shut off and the green ceramic sheet is carefully removed, top Teflon first, then ceramic. One must try to avoid buckling and deforming the corrugation. The ceramic sheet is then trimmed to size and sintered. Alternatively, after the top Teflon sheet is placed on the ceramic sheet, a second pressure chamber with a polymer gasket is placed over the top Teflon sheet. The gasket does not impinge on the ceramic sheet corrugations, but is outside the corrugated area. The pressure chamber is pressurized to 15-45 psi for a few seconds with air or $N_2$. The pressure is released and the top Teflon then the corrugated green ceramic sheet removed. It is envisioned that this technique can be easily automated with roll-to-roll processing.

EXAMPLE

The invention will be further clarified by the following example.

The electrolyte sheet 10 of FIG. 1 was made as follows:
i. In a filtered air "clean" environment, 125 micron thick Teflon® film is smoothed out on a glass plate and then attached to the glass plate with tape.
ii. A slip of zirconia—3 mole % yttria powder is coated on the Teflon® coated cloth using a tape casting "doctor" blade with a 50 micron gap and a 15 cm width, forming a green pre-ceramic sheet.
iii. The sheet was dried for ½ hour at room temperature under a plastic cover that encased the drying green pre-ceramic sheet, with about a 2 mm gap along the width of the ceramic sheet but no gap along the long edges.
iv. The green sheet was then dried in an oven at 60° C. for 1 hour.
v. The green sheet is then corrugated, for example using the vacuum forming method described above, with a mold having a pattern of unit cells corresponding to the electrolyte sheet 10 of FIG. 1A.
vi. Finally, the corrugated green sheet was sintered at 1430° C. for 2 hours.

After sintering, the corrugations of the electrolyte sheet 10 was observed via unaided eye. The optical observation showed that the maximum height of the cells 30 was about 1 mm and the cells were arranged in the corrugation pattern shown in FIG. 1A.

An anode ink, to provide a multiple cell pattern as in FIGS. 12 and 13, was screen printed on the flat portion of the sintered electrolyte sheet 10 (i.e., on the common central area situated between the cells 30). After drying at 150° C. for about a few minutes, the printed anode on the sheet was sintered for 30 minutes to 2 hours between about 1350 C to 1450 C.

Such a corrugated electrolyte sheet with 0.2 mm high domes was placed in an Instron™ tabletop tensile testing machine. Load was measured by a load cell and strain was measured by a stereoscopic optical technique. The corrugated sheet gave a higher apparent tensile strain for a given load, resulting in about 25% drop in the apparent Young's modulus.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An electrolyte sheet, comprising: a substantially non-porous body, said electrolyte sheet having at least one stress-relief area on at least a portion of said electrolyte sheet, said at least one stress-relief area having surface with a plurality of smoothly domed cells separated from one another by arched areas, such that any cross-sectional view of said at least one stress-relief area includes at least one domed cell that is separated from its adjacent domed cells only by arcuate areas.

2. The electrolyte sheet according to claim 1, wherein said smoothly domed cells are arranged around and directed longitudinally toward a common central area.

3. The electrolyte sheet according to claim 1, wherein the electrolyte sheet is a ceramic sheet formed of a polycrystalline ceramic selected from a group consisting of partially stabilized zirconia or stabilized zirconia, and being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof.

4. The electrolyte sheet according to claim 1, wherein said electrolyte sheet has an average thickness greater than 5 micrometers and less than 100 micrometers.

5. The electrolyte sheet according to claim 1, wherein said average thickness is below 45 micrometers.

6. The electrolyte sheet according to claim 1, wherein said average thickness is below 25 micrometers.

7. A solid oxide fuel cell device comprising:
   (i) an electrolyte sheet comprising a substantially non-porous body, said electrolyte sheet having at least one stress-relief area on at least a portion of said electrolyte sheet, said stress-relief area having surface with a plurality of smoothly domed cells separated from one another by arched areas, such that any cross-sectional view of said at least one stress-relief area includes at least one domed cell that is separated from its adjacent domed cells only by arcuate areas; and
   (ii) a plurality of anode/cathode pairs, wherein said plurality of anode/cathode pairs are situated in areas of said electrolyte sheet that do not contain said plurality of smoothly domed cells.

8. The solid oxide fuel cell device according to claim 7 wherein said smoothly domed cells are arranged around and directed longitudinally toward a common central area.

9. The solid oxide fuel cell device according to claim 7 wherein the electrolyte sheet is a ceramic sheet formed of a polycrystalline ceramic selected from a group consisting of partially stabilized zirconia or stabilized zirconia, and being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof.

10. The solid oxide fuel cell device according to claim 7 wherein said electrolyte sheet has an average thickness greater than 5 micrometers and less than 100 micrometers.

11. The solid oxide fuel cell device according to claim 7 wherein said average thickness is below 45 micrometers.

12. The solid oxide fuel cell device according to claim 7 wherein said average thickness is below 25 micrometers.

13. The solid oxide fuel cell device of claim 9, wherein said unit cells are arranged in a periodic manner.

14. The solid oxide fuel cell device according to claim 7, and further comprising a plurality of via galleries including via interconnects that connect anodes and cathodes of said fuel cell device.

15. The solid oxide fuel cell device according to claim 7 wherein the overall thickness of the electrolyte and anode and cathode is less than 100 microns and said fuel cell device also includes a plurality of via galleries.

16. The solid oxide fuel cell device according to claim 7 wherein the cell pitch is 0.5 mm to 2 cm.

17. The solid oxide fuel cell device according to claim 7 wherein the cell pitch is 1 mm to 1 cm.

18. The solid oxide fuel cell device according to claim 7 wherein the cell height is 100 μm to 3 mm.

19. The solid oxide fuel cell device according to claim 7 wherein the cell height is 100 μm to 1 mm.

20. The solid oxide fuel cell device according to claim 7 wherein the cell height is 500 μm to 1 mm.

* * * * *